(12) United States Patent
Ohrn

(10) Patent No.: US 7,956,500 B2
(45) Date of Patent: Jun. 7, 2011

(54) LIQUID-COOLED MACHINE

(75) Inventor: Lars Ohrn, Enkoping (SE)

(73) Assignee: ABB AB (SE)

( * ) Notice: Subject to any disclaimer, the term of this patent is extended or adjusted under 35 U.S.C. 154(b) by 0 days.

(21) Appl. No.: 12/487,433

(22) Filed: Jun. 18, 2009

(65) Prior Publication Data
US 2009/0256434 A1 Oct. 15, 2009

Related U.S. Application Data

(63) Continuation of application No. PCT/EP2007/063677, filed on Dec. 11, 2007.

(30) Foreign Application Priority Data

Dec. 22, 2006 (EP) .................................. 06445077

(51) Int. Cl.
*H02K 21/22* (2006.01)
(52) U.S. Cl. ........................................ 310/58; 310/64
(58) Field of Classification Search ............ 310/54, 310/58, 59, 64
See application file for complete search history.

(56) References Cited

U.S. PATENT DOCUMENTS

| | | | | |
|---|---|---|---|---|
| 2,217,430 A * | 10/1940 | Baudry | ............................ | 310/54 |
| 3,447,002 A * | 5/1969 | Ronnevig | ......................... | 310/54 |
| 3,809,934 A * | 5/1974 | Baer et al. | ......................... | 310/53 |
| 4,246,503 A * | 1/1981 | Fujioka et al. | .................... | 310/59 |
| 4,264,834 A * | 4/1981 | Armor et al. | ..................... | 310/59 |
| 4,301,386 A * | 11/1981 | Schweder et al. | .............. | 310/59 |
| 6,218,747 B1 * | 4/2001 | Tsuruhara | ........................ | 310/54 |
| 2004/0070291 A1 * | 4/2004 | Chan et al. | ...................... | 310/64 |
| 2006/0145548 A1 * | 7/2006 | Wakita | ............................. | 310/54 |

FOREIGN PATENT DOCUMENTS

| | | |
|---|---|---|
| FR | 1400854 A | 5/1965 |
| GB | 1234919 A | 6/1971 |
| WO | 9745915 A1 | 12/1997 |

OTHER PUBLICATIONS

European Search Report; EP 06 44 5077; Jul. 9, 2007; 6 pages.
International Preliminary Report on Patentability; PCT/EP2007/063677; Apr. 6, 2009; 9 pages.
International Search Report and Written Opinion of the International Searching Authority; PCT/EP2007/063677; Jun. 4, 2008; 10 pages.

* cited by examiner

*Primary Examiner* — Quyen Leung
*Assistant Examiner* — Naishadh N Desai
(74) *Attorney, Agent, or Firm* — St. Onge Steward Johnston & Reens LLC

(57) ABSTRACT

A machine includes an inner air-cooled rotor and an outer liquid-cooled stator, in which the stator includes a radial cooling arrangement arranged to convey a cooling liquid radially in the stator.

9 Claims, 2 Drawing Sheets

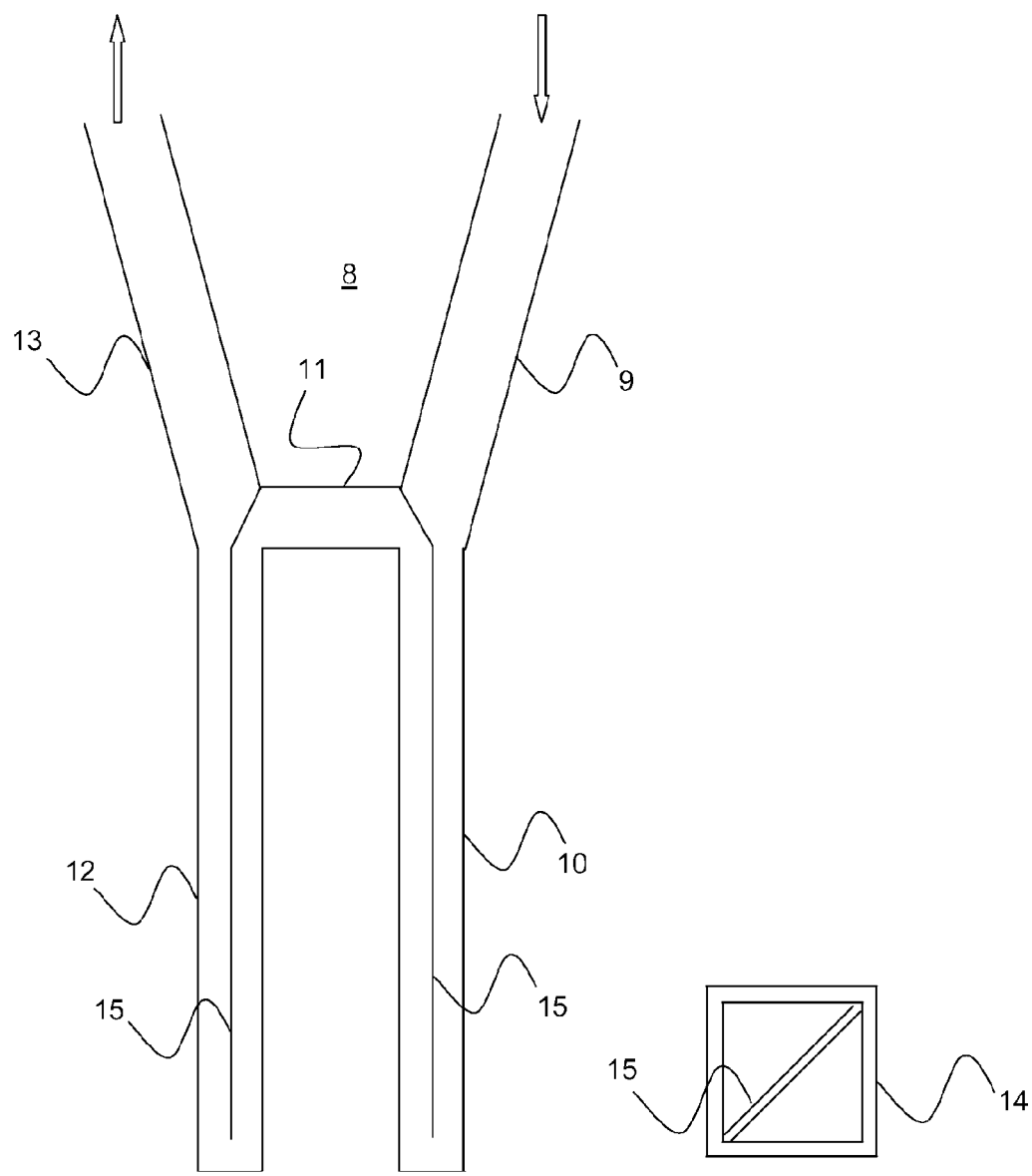
Fig. 3
Fig. 4
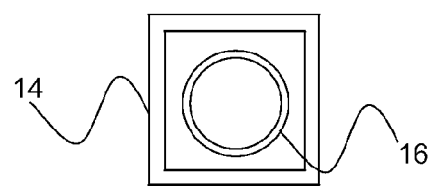
Fig. 5

LIQUID-COOLED MACHINE

CROSS-REFERENCE TO RELATED APPLICATIONS

The present application is a continuation of pending International patent application PCT/EP2007/063677 filed on Dec. 11, 2007 which designates the United States and claims priority from European patent application 06445077.8 filed on Dec. 22, 2006, the content of which is incorporated herein by reference.

FIELD OF THE INVENTION

The present invention relates generally cooling and more particularly to cooling of a liquid-cooled machine.

BACKGROUND OF THE INVENTION

A high voltage machine needs cooling to work properly. The rotor of the machine is generally cooled by means of axially mounted fans, which push air into both ends of the rotor, which air thereafter is released from the machine through radial air ducts in the stator of the machine. For a very high voltage machine the stator needs liquid cooling to work properly. It is however difficult to provide liquid cooling for a stator of a machine and still maintain good performance.

Air and liquid cooled high voltage machines are known in the literature e.g. U.S. Pat. No. 2,217,430 disclose a water cooled stator for a dynamo electric machine where the cooling devices are placed in the air ducts transporting cooling air from the rotor through the stator.

WO9745915 disclose a liquid cooled stator where the cooling fluid is arranged to circulate in the stator teeth.

SUMMARY OF THE INVENTION

An object of the present invention is to provide a machine having a liquid-cooled stator, which machine exhibit good performance.

The invention is based on the realization that by providing the liquid-cooled stator with a radial cooling arrangement the machine exhibits good performance due to adequate cooling with little interference in the stator.

According to a first aspect of the present invention there is provided a machine comprising an inner air-cooled rotor and an outer liquid-cooled stator, wherein said stator comprises a radial cooling arrangement arranged to convey a cooling liquid radially in said stator, said stator comprises axial cable windings and radial air ducts for conveying cooling air from said rotor out of said machine, characterized in that said radial cooling arrangement comprises conduit means for conveying said cooling liquid between said cable windings and said radial air ducts, said radial air ducts are arranged between said conduit means and said conduit means are arranged to directly cool said cable windings as well as shield the cable windings from air conveyed in the radial air ducts.

By providing a machine with a stator comprising axial cable windings it is possible to excite the machine with very high voltages.

By providing an outer stator with radial air ducts cooling air from an inner rotor out is readily conveyed out of the machine.

Further, wherein a radial cooling arrangement comprises conduit means for conveying cooling liquid between a cable winding and a radial air duct the conduit means both directly cools the cable winding as well as shields the cable winding from air conveyed in the radial air duct, which air is heated by cooling of the rotor.

Preferably, the radial cooling arrangement is utilized to also form duct liners for the air ducts. This is readily provided by using a rectangular tube for conveying a cooling liquid therein. By using the radial cooling arrangement as duct liners a manufacturing step can be removed.

By providing the rectangular tube with an inner divider a two-way conduit is formed, which inner divider preferably is a diagonal bulkhead.

Also, wherein the cooling arrangement comprises a first inlet part, a second two-way part, a third middle part, a fourth two-way part and a fifth outlet part, and wherein the second, third and fourth part partly surrounds a plurality of the axial cable excitation windings the radial cooling arrangement occupy little space in the stator. The cooling arrangement preferably comprises a transfer chamber for the second two-way part as well as for the fourth two-way part.

Further preferred embodiments are defined by the appended dependent claims.

BRIEF DESCRIPTION OF THE DRAWINGS

The present invention will become more fully understood from the detailed description of embodiments given below and the accompanying drawings, which are given by way of illustration only, and thus, are not limitative to the present invention, in which:

FIG. 3 schematically illustrates a cooling coil according the present invention;

FIG. 4 schematically illustrates a cross-section of a part of a cooling arrangement; and FIG. 5 schematically illustrates a cross-section of a part of a cooling arrangement according to an alternative embodiment than the one illustrated in FIG. 4.

DETAILED DESCRIPTION OF THE INVENTION

Figure 1:
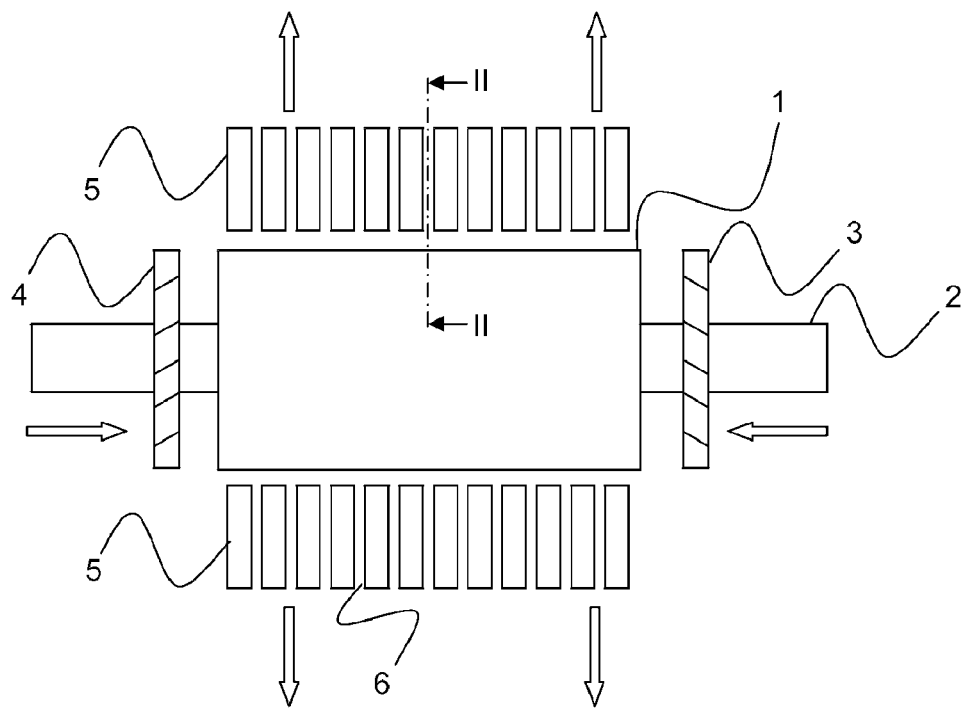
FIG. 1 schematically illustrates air-cooling of an inner rotor in a machine according to an embodiment of the present invention, with an outer stator in the machine partly cut away.

In the following description, for purpose of explanation and not limitation, specific details are set forth, such as particular techniques and applications in order to provide a thorough understanding of the present invention. However, it will be apparent for a person skilled in the art that the present invention may be practiced in other embodiments that depart from these specific details. In other instances, detailed description of well-known methods and apparatuses are omitted so as not to obscure the description of the present invention with unnecessary details.

A preferred embodiment of the present invention will now be described with reference to FIG. 1-4.

A machine, particularly a very high voltage machine, comprises an inner air-cooled rotor 1 and an outer liquid-cooled stator 5. The rotor 1 has axial fans 3 and 4 mounted on its shaft 2. The fans 3 and 4 draw air onto the rotor 1 from its respective axial ends to cool the rotor 1 during use. The stator 5 comprises radial air ducts 6 to convey the cooling air out from the machine. The stator 5 with its radial air ducts 6 is in FIG. 1 schematically illustrated by a vertical cut axially through the stator 5.

Figure 2:
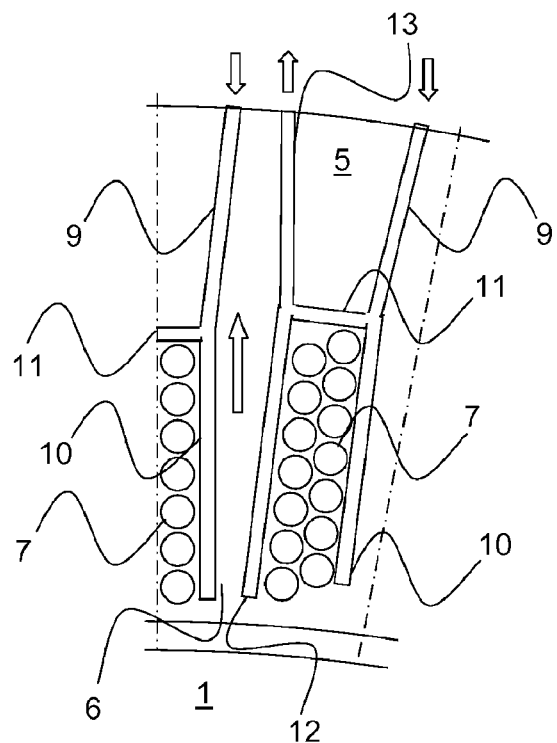
FIG. 2 schematically illustrates radial liquid-cooling of the outer stator in the machine illustrated in FIG. 1, along a cut along the line II-II.

A sectional part of the stator 5 is in FIG. 2 in more detail illustrated by a vertical cut radially through stator 5 along the line II-II in FIG. 1. The stator 5 comprises a radial cooling arrangement 8 arranged to convey a cooling liquid, such as a mixture of water and glycol or an oil, radially in the stator 5. The stator comprises excitations windings in the form of axial cable windings 7 instead of conventional windings, which cable windings 7 are used to achieve very high voltages for the machine. The inventive cooling is particularly useful for cable-wound stators since the cables are relatively sensitive to heat and thus need efficient cooling. However, the inventive cooling is also applicable to machines using conventional windings, which also benefit of efficient cooling. By conveying the cooling liquid radially in the stator minimal amounts of iron need to be removed from the stator core and the power of the machine can thus be maximized.

The cooling arrangement 8 comprises conduit means, such as a cooling coil, for conveying the cooling liquid between the cable windings 7 and the radial air ducts 6, to both directly cool the cable windings 7 as well as shield the cable windings 7 from air conveyed in the radial air ducts 6. The radial air ducts 6 will thus be positioned between conduit means, which will isolate the cable windings 7 from the radial air ducts 6. Preferably, the conduit means forms duct liners for the radial air ducts 6. By making the conduit means of metal the power of the machine can be increased. The conduit means should preferably be located as close to the cable windings 7 as possible to not block the radial air duct 6.

Advantageously, the conduit means comprises a rectangular tube 14 for conveying the cooling liquid therein. The rectangular tube 14 is suitable as duct liner and easy to manufacture, but the tube can however also have other desired cross-sections. The rectangular tube 14 includes a first inlet part 9, a second two-way part 10, a third middle part 11, a fourth two-way part 12 and a fifth outlet part 13. The two-way parts 10 and 12 are preferably formed by an inner divider 15, such as a diagonal bulkhead. The inner divider could however be formed also in other ways such as by an inner circular tube 16.

A cooling coil is illustrated in FIG. 3. The cooling liquid enters the conduit means through the first inlet part 9. The cooling liquid thereafter enters a first half of the second two-way part 10. At the radial inner end of the second two-way part 10 is a transfer chamber arranged that transfers the cooling liquid back into the other half of the second two-way part 10. The cooling liquid thereafter enters the third middle part 11 and continues into a first half of the fourth two-way part 12. Also this fourth two-way part 12 is ended with a transfer chamber that transfers the cooling liquid back into the other half of the fourth two-way part 12. Finally the cooling liquid enters the outlet part 13 to exit the conduit means. The conduit means thus almost completely surrounds a plurality of the axial cable windings 7. By inclining the respective transfer chambers towards each other the axial cable windings 7 can be completely surrounded by the conduit means. A transfer chamber is preferably provided by using the two-way parts without an inner divider 15, 16.

Several axially distributed conduit means can be sequentially connected to each other through e.g. a bent tube or can be separately connected to a major axial cooling tube running along the stator 5. A plurality of radially distributed conduit means are preferably connected to a plurality of major axial cooling tubes running along the stator 5, preferably all connected to an inlet major cooling tube running peripherally at a first side of the stator 5 and to an outlet major cooling tube running peripherally at a second end of the stator 5.

It will be obvious that the present invention may be varied in a plurality of ways. Such variations are not to be regarded as departure from the scope of the present invention as defined by the appended claims. All such variations as would be obvious for a person skilled in the art are intended to be included within the scope of the present invention as defined by the appended claims.

What is claimed is:

1. A machine comprising an inner air-cooled rotor and an outer liquid-cooled stator, wherein said stator comprises a radial cooling arrangement arranged to convey a cooling liquid radially in said stator, said stator comprises axial cable windings and radial air ducts for conveying cooling air from said rotor out of said machine, characterized in that said radial cooling arrangement comprises conduit means for conveying said cooling liquid between said cable windings and said radial air ducts to directly cool said cable windings as well as shield the cable windings from air conveyed in the radial air ducts.

2. The machine according to claim 1, wherein said radial cooling arrangement forms a duct liner for said radial air ducts.

3. The machine according to claim 1, wherein said conduit means comprises a rectangular tube for conveying said cooling liquid therein.

4. The machine according to claim 3, wherein said rectangular tube comprises an inner divider to form a two-way conduit.

5. The machine according to claim 1, wherein said cooling arrangement comprises a first inlet part, a second two-way part, a third middle part, a fourth two-way part and a fifth outlet part.

6. The machine according to claim 5, wherein said second, third and fourth part partly surrounds a plurality of said axial cable excitation windings.

7. The machine according to claim 5, wherein said cooling arrangement comprises a transfer chamber for the second two-way part as well as for the fourth two-way part.

8. The machine according to claim 4, wherein the two-way conduit comprises a diagonal bulkhead.

9. The machine according to claim 1, wherein the conduit means are made of metal.

* * * * *